United States Patent
Kagan et al.

(10) Patent No.: US 9,417,064 B2
(45) Date of Patent: Aug. 16, 2016

(54) SYSTEM AND METHOD FOR NORTH FINDING

(75) Inventors: Avraham Kagan, Ramat-Hasharon (IL); Michael Benisty, Shoam (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 565 days.

(21) Appl. No.: 13/884,856

(22) PCT Filed: Nov. 9, 2011

(86) PCT No.: PCT/IL2011/050006
§ 371 (c)(1),
(2), (4) Date: May 10, 2013

(87) PCT Pub. No.: WO2012/063243
PCT Pub. Date: May 18, 2012

(65) Prior Publication Data
US 2013/0238280 A1 Sep. 12, 2013

(30) Foreign Application Priority Data
Nov. 11, 2010 (IL) .......................................... 209261

(51) Int. Cl.
G01C 17/00 (2006.01)
G01C 19/38 (2006.01)
G01C 21/18 (2006.01)

(52) U.S. Cl.
CPC ................ G01C 17/00 (2013.01); G01C 19/38 (2013.01); G01C 21/18 (2013.01)

(58) Field of Classification Search
CPC ......... G01C 19/38; G01C 17/00; G01C 21/18
USPC ............ 702/105, 150; 33/323, 324, 321, 318, 33/316; 73/504.02, 504.16, 504.12, 510; 342/60, 62
See application file for complete search history.

(56) References Cited

U.S. PATENT DOCUMENTS

| | | | |
|---|---|---|---|
| 2,504,170 A | 4/1950 | Wong | |
| 2,972,195 A * | 2/1961 | Campbell | G01C 19/38 33/324 |
| 3,813,788 A * | 6/1974 | Johnston | G01C 19/38 33/321 |
| 4,123,164 A * | 10/1978 | Tambor | G01B 11/26 250/203.6 |
| 4,204,210 A * | 5/1980 | Hose | F41G 7/30 342/25 A |
| 4,520,973 A * | 6/1985 | Clark | F41G 7/2213 244/3.16 |
| 4,945,647 A * | 8/1990 | Beneventano | G01C 19/38 33/318 |
| 5,060,392 A * | 10/1991 | Grasso | G01C 21/18 33/318 |
| 5,272,922 A * | 12/1993 | Watson | A44B 18/0049 33/318 |

(Continued)

FOREIGN PATENT DOCUMENTS

| | | |
|---|---|---|
| GB | 791 556 A | 3/1958 |
| GB | 892 969 A | 4/1962 |
| GB | 1 516 074 A | 6/1978 |

*Primary Examiner* — Carol S. W. Tsai
(74) *Attorney, Agent, or Firm* — Oliff PLC

(57) ABSTRACT

A payload including a gimbal assembly and gyro assembly that includes a gyro assembly control associated with the gyro assembly and operable to trigger the gyro assembly to obtain deviation measurements and process the measurements in a first dynamic range for stabilizing the payload utilizing the gimbal assembly. The gyro assembly control is operable to trigger the gyro assembly to obtain instantaneous measurements and process the measurements in a second dynamic range having different sensitivity than the first dynamic range, for finding deviation of the payload from the magnetic north of the earth.

20 Claims, 4 Drawing Sheets

(56) References Cited

U.S. PATENT DOCUMENTS

| | | | |
|---|---|---|---|
| 5,408,751 A | 4/1995 | Rodloff et al. | |
| 5,703,293 A * | 12/1997 | Zabler | G01C 19/574 73/504.02 |
| 6,396,235 B1 * | 5/2002 | Ellington | F41G 3/22 318/649 |
| 6,502,055 B1 * | 12/2002 | Reiner | G01C 19/38 701/530 |
| 6,621,460 B2 * | 9/2003 | Challoner | G01C 19/42 342/359 |
| 6,895,678 B2 * | 5/2005 | Ash | E21B 47/022 33/313 |
| 6,918,186 B2 * | 7/2005 | Ash | G01C 21/16 33/304 |
| 7,093,370 B2 * | 8/2006 | Hansberry | E21B 47/022 33/313 |
| 7,412,775 B1 * | 8/2008 | Karnick | G01C 19/38 33/316 |
| 7,877,887 B2 * | 2/2011 | Watson | E21B 47/022 33/324 |
| 2005/0022402 A1 * | 2/2005 | Ash | G01C 21/16 33/321 |
| 2005/0022404 A1 * | 2/2005 | Ash | E21B 47/022 33/366.13 |
| 2005/0126022 A1 * | 6/2005 | Hansberry | E21B 47/022 33/313 |
| 2009/0119937 A1 * | 5/2009 | Watson | E21B 47/022 33/313 |
| 2009/0296281 A1 * | 12/2009 | Baker | G01C 19/02 360/245.3 |

* cited by examiner

SYSTEM AND METHOD FOR NORTH FINDING

FIELD OF THE INVENTION

This invention relates to the field of systems and methods for North finding.

BACKGROUND OF THE INVENTION

Prior art references considered to be relevant as a background to the invention are listed below. Acknowledgement of the references herein is not to be inferred as meaning that these are in any way relevant to the patentability of the invention disclosed herein. U.S. Pat. No. 4,945,647 discloses a gyrocompassing system intended for land based equipment requiring north reference information, and includes a novel gyrocompass implementation which enables utilization of high grade inertial sensors while achieving the desired goal of moderate cost. The north finding system is designed to provide high accuracy with fast reaction time over a wide temperature range without the aid of heaters and other auxilliary equipment. The arrangement is specifically configured to tolerate settling and/or oscillatory base motion without additional reaction time or degradation of gyrocompassing accuracy.

U.S. Pat. No. 5,060,392 discloses a gyrocompassing system intended for land based equipment requiring north reference information, and includes a novel gyrocompass implementation which enables utilization of high grade inertial sensors while achieving the desired goal of moderate cost. The north finding system is designed to provide high accuracy with fast reaction time over a wide temperature range without the aid of heaters and other auxiliary equipment. The arrangement is specifically configured to tolerate settling and/or oscillatory base motion without additional reaction time or degradation of gyrocompassing accuracy. The input axis of a gyroscope used in the system is skewed, so it can measure a component of gimbal rotation, thereby eliminating the need for independently measuring the relative gimbal angle. Absolute position alignment between the gimbal and the system case as is required, is accomplished by an appropriate stop arrangement, which is an easier task than measuring the relative gimbal angle as aforenoted.

U.S. Pat. No. 5,272,922 discloses a vibrating element angular rate sensor system and north seeking gyroscope. An angular rate sensor system preferably comprising closely spaced vibrating drive and sensing elements in a paired tuning fork configuration mounted to rotate about a rotational axis oriented perpendicular to the sensitive axes. The rotational drive assembly includes an encoder to modulate sensing element orientation, and coupling means to transmit drive and output signals to and from the rotating elements. Each pair of sense and drive elements are disposed in non-aligned parallel side-by-side opposition across the axis of rotation. The elements may be carried on torsional masses including a resilient coupling therebetween. The angular rate sensor system may be utilized as a north-seeking gyroscope in applications such as mining, surveying, or artillery. The phase of the sinusoidal sensor output signal corresponds to the orientation between the sensitive axis of the sensing elements and the earth's angular rate vector to produce a reference to geographic north. The electronic filter includes a signal generator, two phase-locked loops, AC amplifiers, bandpass filter, comparator, counter-divider, and latch to iterate a steady phase reading. A settling time of approximately 30-60 seconds is required to resolve a heading reference within +0.1.degree of geographic north. A two axis low bias embodiment of the angular rate sensor system may be utilized alone or in combination with a similar system to provide complete angular rate sensing along a desired common axis, or with a second stationary angular rate sensor to enhance the bandwidth and DC response of the stationary angular rate sensor.

U.S. Pat. No. 5,272,922 discloses a high resolution gyro system for precise angular measurement. The system includes for planar angular measurements a gyro—preferably a laser gyro—and an angle encoder mounted with their sensitive axes coaxially on a turntable shaft, which is rotatably mounted in a case and driven at constant speed with respect to the case. The angular rate should be high enough to operate the laser gyro above the lock-in rate. For spatial angular measurements and navigation three gyros are mounted with their sensitive axes spatially arranged with respect to the turntable shaft to sense the same component of its angular rate. For averaging errors due to gyro scalefactor and drift, the turntable is mounted on a second shaft with its axis perpendicular to the turntable. The second shaft is provided with a second encoder and a motor rotating the second shaft. The processing of the signal readout of the gyro(s) and encoder(s) allows to increase the accuracy, resolution and bandwidth of angular measurements with respect to a locally fixed basis or to inertial space.

U.S. Pat. No. 5,703,293 discloses a rotational rate sensor with two acceleration sensors. A rotational sensor has a vibrating weight with two acceleration sensors mounted on it. The two acceleration sensors are designed to detect forces acting at a right angle to each other. The vibrating weight is set in vibration by means of driving devices, and rotation of the rotational sensor about two axes of rotation that are normal to each other is detected with the help of the acceleration sensors. The Coriolis forces in a plane are determined in this way.

U.S. Pat. No. 6,502,055 discloses a method and apparatus for determining the geographic heading of a body, and a method of determining an orientation of a body. The method includes the steps of measuring an acceleration of the body in a first direction, measuring an acceleration of the body in a second direction different from the first direction, the first direction and the second direction defining a plane, measuring an acceleration perpendicular to the plane in a coordinate system rotating about an axis perpendicular to the plane, and inferring the orientation of the body from the three measurements.

U.S. Pat. No. 6,621,460 discloses instrument alignment devices and methods for determining an instrument boresight heading. The apparatus comprises an instrument having a boresight, an elevation positioner for positioning the elevation of the instrument boresight having an elevation axis, an azimuth positioner for positioning the azimuth of the instrument boresight having an azimuth axis and a sensor including a gyro having a sensitive axis. The method comprises recording a first output of a gyro of an azimuth positioner having an instrument boresight azimuth heading in a first position, rotating the azimuth positioner to a second position, recording a second output of the gyro and rotating the azimuth positioner to a third position, recording a third output of the gyro and determining the azimuth heading relative to true north from the first, second and third output.

U.S. Pat. No. 7,412,775 discloses a gyroscope north seeker system and method which includes a sensor system and method for determining a relative direction to true north. The system comprises at least one angular rate sensor, such as a MEMS sensor, which has an input axis and a rotation axis. The sensor comprises a motor drive structure, a motor signal output from the motor drive structure, a gyroscope, and a sensor rate output from the gyroscope for a sensor rate signal. A frequency divider is in operative communication with the motor signal output, and a spinning device is coupled to the angular rate sensor. A spinning device motor is coupled to the spinning device and is in operative communication with the frequency divider. The spinning device motor has an axis of rotation that is substantially perpendicular to the input axis of the sensor. The spinning device motor is configured to be driven by a periodic signal from the sensor. A position of the spinning device is synchronized to the periodic signal to generate a spinning device position signal. A phase detector is in operative communication with the spinning device motor and with the sensor rate output. The relative direction to true north is determined from a phase differential between the spinning device position signal and the sensor rate signal.

There is a need in the art to provide for a new technique for North finding incorporated in a payload.

SUMMARY OF THE INVENTION

In accordance with an aspect of the presently disclosed subject matter, there is provided a payload including a gimbal assembly and gyro assembly, comprising a gyro assembly control associated with the gyro assembly and operable to trigger the gyro assembly to obtain deviation measurements and process the measurements in a first dynamic range for stabilizing the payload utilizing the gimbal assembly; the gyro assembly control being operable to trigger the gyro assembly to obtain instantaneous measurements and process the measurements in a second dynamic range having different sensitivity than the first dynamic range, for finding deviation of the payload from the magnetic north of the earth.

In accordance with an embodiment of the presently disclosed subject matter, there is further provided a payload, wherein the gyro assembly includes an azimuth rate gyro and an elevation rate gyro disposed perpendicularly thereto; the gyro assembly control being operable to drive the elevation rate gyro to rotate about azimuth axis for obtaining and recording instantaneous measurements during at least 360° rotation; the gyro assembly control being further operable to derive a wander angle representative of the deviation from the north based on the recorded measurements.

In accordance with an embodiment of the presently disclosed subject matter, there is yet further provided a payload, wherein the gyro assembly control module is configured to calculate a sine wave that fits the measurements and derives the wander angle from the sine wave.

In accordance with an embodiment of the presently disclosed subject matter, there is yet further provided a payload wherein the longer the duration t of the rotation about the azimuth axis, the lower the error of the measurements.

In accordance with an embodiment of the presently disclosed subject matter, there is yet further provided a payload, wherein the measurements yield:

measurements=$\Omega$*cos($\phi$)*cos($\alpha$), where
$\Omega$ stands for the earth rotation rate
$\phi$ stands for the latitude
$\alpha$ stands for the wander angle that changes according to instantaneous measurements of the elevation rate gyro during the at least 360° rotation,
and wherein the deviation being a phase shift $\alpha$ of the sine wave that fits the measurements.

In accordance with an embodiment of the presently disclosed subject matter, there is yet further provided a payload, further comprising a tilt sensor for sensing tilt measurements of the payload in either or both of roll and pitch axes, and wherein the gyro assembly control is configured to calculate compensation commands for transmission to the gimbal assembly for reducing or elimination the tilt measurements, whereby the payload is rendered leveled.

In accordance with an embodiment of the presently disclosed subject matter, there is yet further provided a payload wherein the payload is fitted on a mobile platform that is subjected to spatial orientation deviations in either or both of azimuth plane or elevation plane, and wherein the spatial deviations are measured by the gyro assembly and wherein the measurements are processed by the gyro assembly control to obtain compensation commands for triggering the gimbal assembly to compensate for the spatial deviations and stabilize the payload, and wherein the deviation from the magnetic north of the earth is derived from the stabilized payload, irrespective of the deviations of the platform.

In accordance with an embodiment of the presently disclosed subject matter, there is yet further provided a payload, wherein the payload is fitted on a mobile platform that is subjected to spatial orientation deviations in either or both of azimuth plane or elevation plane, and wherein the spatial deviations in the azimuth plane are measured by the azimuth rate gyro irrespective of the 360° rotation and wherein the spatial deviations in the elevation plane are measured by the elevation rate gyro irrespective of the 360° rotation and wherein the measurements are processed by the gyro assembly control to obtain data for triggering the gimbal assembly to compensate for the deviations and stabilize the payload, and wherein the deviation from the magnetic north of the earth is derived from the stabilized payload, irrespective of the deviations of the platform.

In accordance with an embodiment of the presently disclosed subject matter, there is yet further provided a payload, wherein the sensitivity is dependent upon the rotation rate of the gyros in the stabilization mode of operation.

In accordance with an embodiment of the presently disclosed subject matter, there is yet further provided a payload, wherein the rotation rate is 100[°/s].

In accordance with an embodiment of the presently disclosed subject matter, there is yet further provided a payload, wherein the sensitivity is dependent upon a tradeoff parameter.

In accordance with an embodiment of the presently disclosed subject matter, there is yet further provided a payload, wherein the tradeoff parameter is 5%.

In accordance with an aspect of the presently disclosed subject matter, there is yet further provided a payload including a gimbal assembly and a gyro assembly, comprising a gyro assembly control associated with the gyro assembly operable to trigger the gyro assembly to obtain deviation measurements and process the measurements for stabilizing the payload utilizing the gimbal assembly; the gyro assembly control being operable to trigger the gyro assembly to obtain instantaneous measurements and process the measurements, for finding deviation of the payload from the magnetic north of the earth, irrespective of the latitude of the payload.

In accordance with an embodiment of the presently disclosed subject matter, there is yet further provided a payload, wherein the gyro assembly control is operable to trigger the gyro assembly to obtain deviation measurements and process the measurements in a first dynamic range for stabilizing the payload; the gyro assembly control module being operable to trigger the gyro assembly to obtain instantaneous measurements and process the measurements in a second dynamic range having different sensitivity than the first dynamic range.

In accordance with an embodiment of the presently disclosed subject matter, there is yet further provided a payload, wherein the payload is fitted on a mobile platform that is subjected to spatial orientation deviations in either or both of azimuth plane or elevation plane, and wherein the spatial deviations are measured by the gyro assembly and wherein the measurements are processed by the gyro assembly control to obtain data for triggering the gimbal assembly to compensate for the spatial deviations and stabilize the payload, and wherein the deviation from the magnetic north of the earth is derived from the stabilized payload, irrespective of the deviations of the platform.

In accordance with an aspect of the presently disclosed subject matter, there is yet further provided a method for dual mode utilization of a payload that includes a gimbal assembly and a gyro assembly, comprising:

(i) triggering the gyro assembly to obtain deviation measurements and process the measurements in a first dynamic range for stabilizing the payload utilizing the gimbal assembly; and (ii) triggering the gyro assembly to obtain instantaneous measurements and process the measurements in a second dynamic range having different sensitivity than the first dynamic range, for finding deviation of the payload from the magnetic north of the earth.

In accordance with an aspect of the presently disclosed subject matter, there is yet further provided a method for dual mode utilization of a payload that includes a gimbal and a gyro assembly, comprising:

(i) triggering the gyro assembly to obtain deviation measurements and process the measurements for stabilizing the payload utilizing the gimbal assembly; and (ii) triggering the gyro assembly to obtain instantaneous measurements and process the measurements, for finding deviation of the payload from the magnetic north of the earth, irrespective of the latitude of the payload.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

Figure 1A:
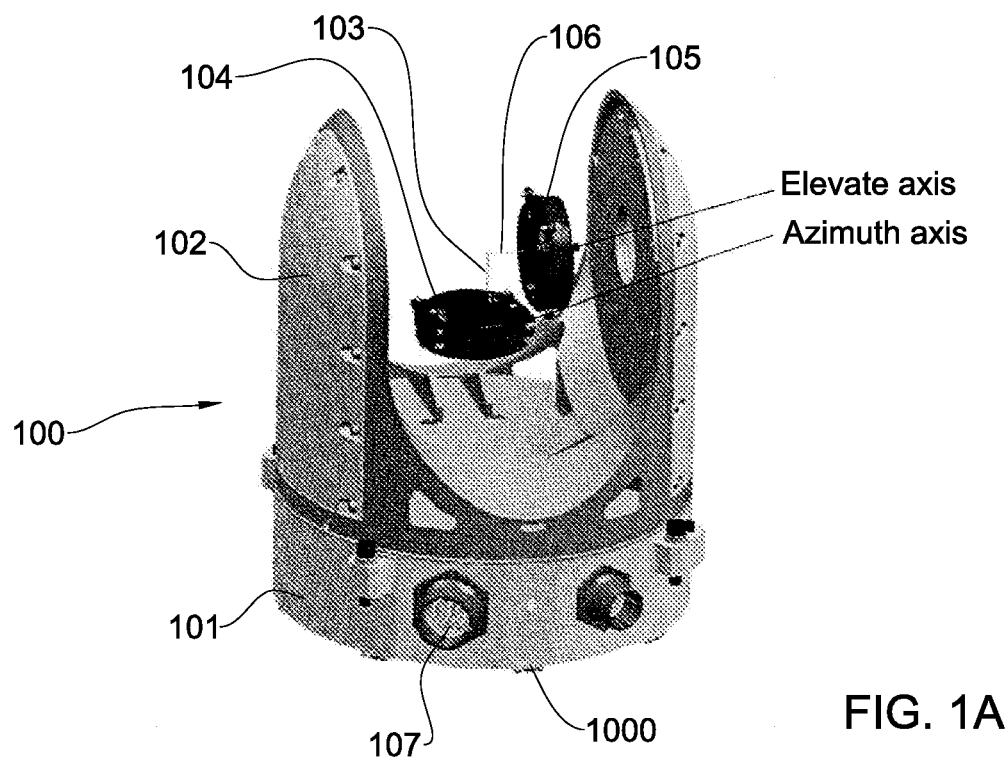
FIG. 1A illustrates schematically a isometric three-dimensional representation of a payload according to certain embodiments of the invention.

Attention is first drawn to FIG. 1A illustrating schematically an isometric three-dimensional representation of a payload 100 according to certain embodiments of the invention. The payload includes a gimbal assembly (whose structure will be described in greater detail with reference to FIG. 1B) which in turn is associated with a gyro assembly. The payload 100 has a base section 101 that is fixedly attached to the platform on which the payload is mounted (not shown in FIG. 1), e.g. a mobile platform such as a land or maritime vehicle or, by way of another example, a stationary object.

The payload 100 further includes a rotatable frame 102 having one degree of freedom about axis 103 (of the gimbal assembly). The gyro assembly includes an azimuth gyro 104 configured to measure azimuth deviations and an elevation gyro 105 being disposed normally to the azimuth rate gyro 104, configured to measure deviation in the elevation plane, and also configured to obtain measurements that facilitate calculation of deviation from the magnetic north, all as will be explained in greater detail below.

The payload further includes a gyro assembly control (accommodated, say in frame 102 of FIG. 1) associated with the gimbal assembly and gyro assembly and more specifically receiving measurement signals from the gyro assembly and feeding commands to the gimbal assembly. As will be explained in greater detail below, the gyro assembly control is operable to trigger the gyro assembly to obtain deviation measurements and process the measurements in a first dynamic range for stabilizing the payload.

Note that the payload may be fitted on a mobile platform e.g. moving vehicle. The latter may be subjected to spatial orientation deviations in either the azimuth plane or the elevation plane, e.g. due to movement of the vehicle on a rough terrain. The stabilization mode of operation of the payload is generally known per se (and will be further discussed in FIG. 6 below). Thus, as is well known, deviations in the azimuth plane are measured by the azimuth rate gyro 104 and deviations in the elevation plane are measured by the elevation rate gyro 105. Data indicative of the deviation measurements are communicated to the gyro assembly control, for calculating in a known per se manner compensation commands. The latter commands are fed to the gimbal assembly for compensating or eliminating the specified undesired deviations, thereby stabilizing the payload.

The net effect would thus be that whilst the platform is subjected to undesired deviations in the azimuth and/or elevation plane (e.g. due to moving on rough terrain) the payload affixed thereto is stabilized, capable, for example, of maintaining a LOS towards a stationary target without being affected by the vehicles' deviations.

As is generally known per se for achieving stabilization, the rate gyros move at a relatively fast rate and the rate gyros measurements (corresponding to the deviations) are recorded at a resolution of say 100°/sec and the data is fed through to the gyro assembly control (not shown in FIG. 1A) for determination of the specified compensation commands. In the stabilization mode, the payload operates within a dynamic range that corresponds to the specified measurement rates of say 16 bits, with the LSB indicating a sign and the other 15 bits recording the measured values, all for properly recording measurements at a rate of about 100°/sec.

In contrast to the specified stabilization mode of operation and as will be explained in greater detail below, the gyro assembly control (not shown in FIG. 1A) is operable to trigger the elevation rate gyro to obtain instantaneous measurements and process the measurements in a second dynamic range considerably more sensitive than the first dynamic range, for finding deviation of the payload from the magnetic north of the earth.

In the (latter) north finding mode, the payload 100 is operable to find deviation from the magnetic north of the earth. This allows determination of the deviation (wander) angle α relative to the north. It is accordingly appreciated that substantially the same infrastructure of the elevation rate gyro which is designated for stabilization purposes can be utilized to determine deviation from the north.

In accordance with hitherto known techniques, when utilizing a payload for stabilization purposes, it is required to utilize external resources such as a magnetic compass for determining the deviation angle relative to the north. Using external equipment is not only more costly, but is also error prone. For instance, a magnetic compass is susceptible to errors when operating in geographical areas which are rich in metal quarries. Thus, in accordance with certain embodiments of the presently disclosed subject matter, the utilization of substantially the same infrastructure for determining north finding (whilst avoiding the use of additional equipment) is not only more commercially lucrative, but is also less error prone.

Reverting now to FIG. 1A, and as will be explained in greater detail below, in order to obtain appropriate measurements for deriving the deviation angle α from the north, the gyro assembly control should measure values at the order of 15°/hour (the rate of rotation of earth—i.e. 360°/24 hours) which are of considerably higher sensitivity than the specified 100°/sec required for the stabilization task. This requirement stipulates using a significantly different dynamic range than that required for utilizing the payload for the stabilization task, all as will be explained in greater detail below.

Note also that in accordance with certain embodiments, in the north finding mode of operation the gimbal assembly and the gyro assembly should be leveled. In cases where it is off-level (i.e. subjected to tilt in either or both of the roll and pitch assembly) a known per se correction procedure is applied for rendering it leveled.

Note that in accordance with certain embodiments, the gyro assembly is operable to rotate both the azimuth rate gyro and the elevation rate gyro about the azimuth axis 103 for obtaining instantaneous measurements by the elevation rate gyro during at least 360° rotation, and record the measurements. As will be explained in greater detail below, based on the so recorded measurements, the gyro assembly control is operable to calculate a sine wave that fits the measurements and derives a wander angle α (from the sine) representative of the deviation from the north.

It is thus noted that the elevation gyro is not only configured to measure deviations in the elevation plane, but also to obtain measurements for calculation of a wander angle α from the North. Consequently, the whole payload is configured to operate also in a dual mode i.e. (i) stabilization (e.g. maintaining LOS to a target) and (ii) determining deviation from the North, (irrespective of the azimuth and elevation deviations of the platform to which the payload is affixed).

Figure 1B:
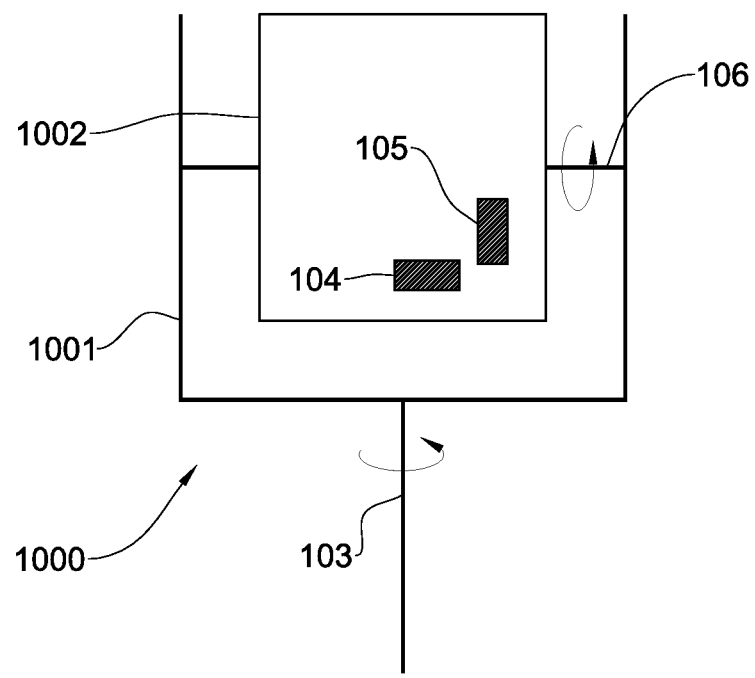
FIG. 1B illustrates a schematic representation of a gimbal assembly according to certain embodiments of the invention.

For a better understanding of the foregoing, attention is directed to FIG. 1B illustrating a schematic representation of a gimbal assembly 1000 according to certain embodiments of the invention. Thus, a frame 1001 is configured to rotate about azimuth axis 103. Frame 1002 coupled to frame 1001 is capable of rotating about elevation axis 106 normal to the azimuth axis 103. Azimuth rate gyro 104 and elevation rate gyro 105 disposed perpendicularly thereto (both included in the gyro assembly) are fixedly attached to frame 1002. As specified above, the azimuth rate gyro 104 is capable of measuring deviations in the azimuth plane and the elevation rate gyro operates in configured to operate in dual mode, measuring deviations in the elevation plane and obtaining measurements for calculating wander angle from the north (all as will be explained in detail below). Note that the simplified structure of the gimbal assembly and gyro assembly is provided for illustrative purposes only and is by no means binding.

In accordance with certain embodiments there may be additional mode or modes of operation, all as required and appropriate.

Figure 2:
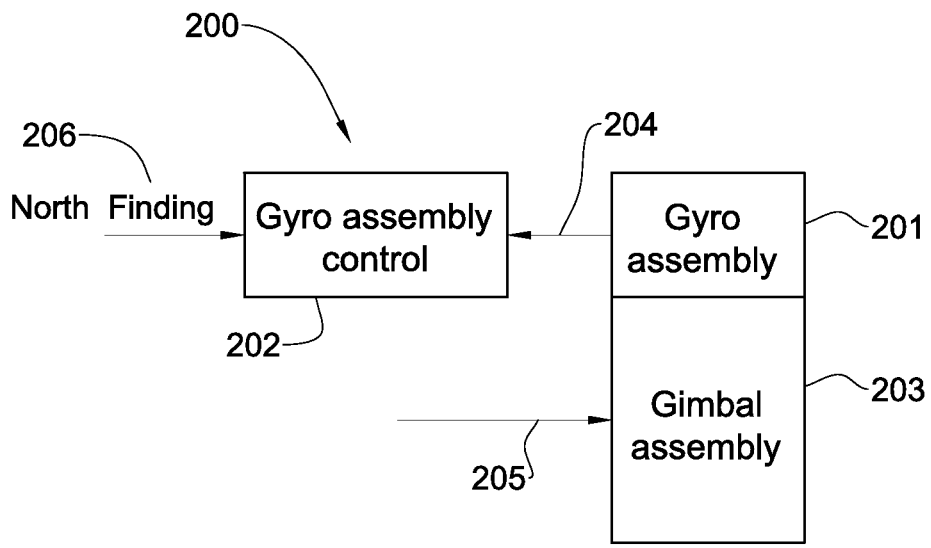
FIG. 2 illustrates schematically a generalized block diagram of a system according to certain embodiments of the invention.

Attention is now drawn to FIG. 2, illustrating schematically a generalized block diagram of a payload system 200 system according to certain embodiments of the invention. Thus, the payload 200 includes a gyro assembly 201 associated with gimbal assembly 203, both electrically associated with gyro assembly control 202.

The gyro assembly control 202 is operable to trigger the gyro assembly 201 to obtain deviation measurements 204 and process the measurements in a first dynamic range for issuing compensation commands 205 to the gimbal assembly for stabilizing the payload. In response to appropriate command 206, the gyro assembly control 202 is operable to trigger the gyro assembly 201 to obtain instantaneous measurements from the elevation rate gyro and process the measurements in a second dynamic range significantly more sensitive than said first dynamic range, for finding deviation of the payload from the magnetic north of the earth, all as discussed in detail above.

Note the invention is not bound by the structure and design of FIGS. 1A and 1B, and neither by the generic architecture of FIG. 2.

Figure 3:
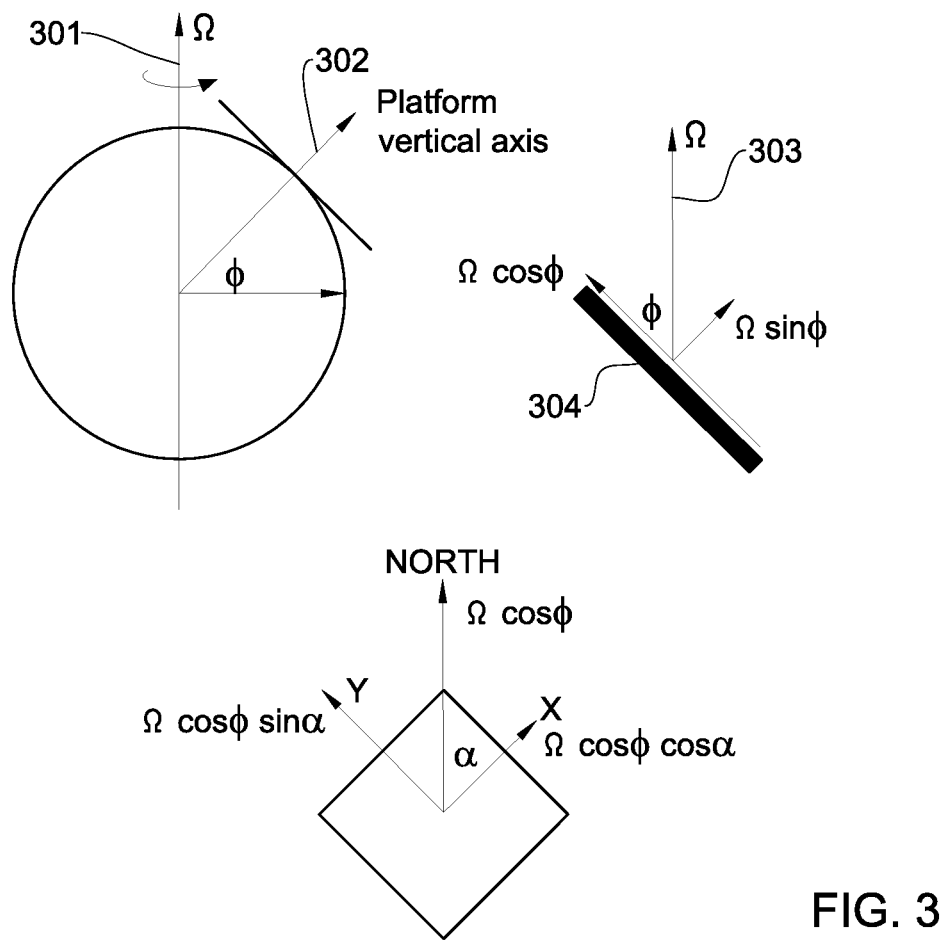
FIG. 3 illustrates schematically geometrical charts of North finding, for use in a system according to certain embodiments of the invention.

Turning now to FIG. 3, it illustrates schematically geometrical charts of north finding, in accordance with certain embodiments of the presently disclosed subject matter. As shown in FIG. 2, the vector $\Omega$ (301) indicates the earth rotation rate of 15°/hour. Vector 302 indicates the platform's (affixing payload 100 of FIG. 1) rotation rate $\Omega^*\cos(\phi)$ at latitude $\phi$ (where the platform resides). This is clearly demonstrated by vectors 303 (standing for rotation rate $\Omega$) and vector 304 standing for rotation rate $\Omega \cos(\phi)$ degrees per hour (assuming wander angle=0). The wander angle α is the sought deviation angle of the platform relative to the North. Thus, assuming that the platform resides at latitude ($\phi$) and has a deviation angle α (α>0) relative to the north, then the rotation rate of the platform (and obviously of the payload rotatably mounted thereon) is $\Omega \cos(\phi) \cos(\alpha)$ degrees per hour.

Note that the determination of α does not require taking into account the latitude, and accordingly can be performed irrespective of the latitude where the payload is located.

As explained above, the azimuth rate gyro 104 and the elevation rate gyro 105 rotate integrally about the azimuth axis 103 for at least 360° and the azimuth gyro measurements are recorded. During the specified 360° rotation, the deviation angle α relative to the north obviously changes giving rise to a change in the $\Omega \cos(\phi)\cos(\alpha)$ value. The latter value is constantly measured by the elevation rate gyro 105 and is further processed by the gyro assembly control.

Thus, the gyro assembly control is operable to calculate a sine wave that fits the varying ($\Omega \cos(\phi)\cos(\alpha)$) measurements and derives a phase shift of the sine which corresponds to a constant wander angle α signifying the deviation of the payload from the north. In accordance with certain embodiments, the best fit algorithm that is used is the least square, however the presently disclosed subject matter is not bound by this particular example.

Figure 4:
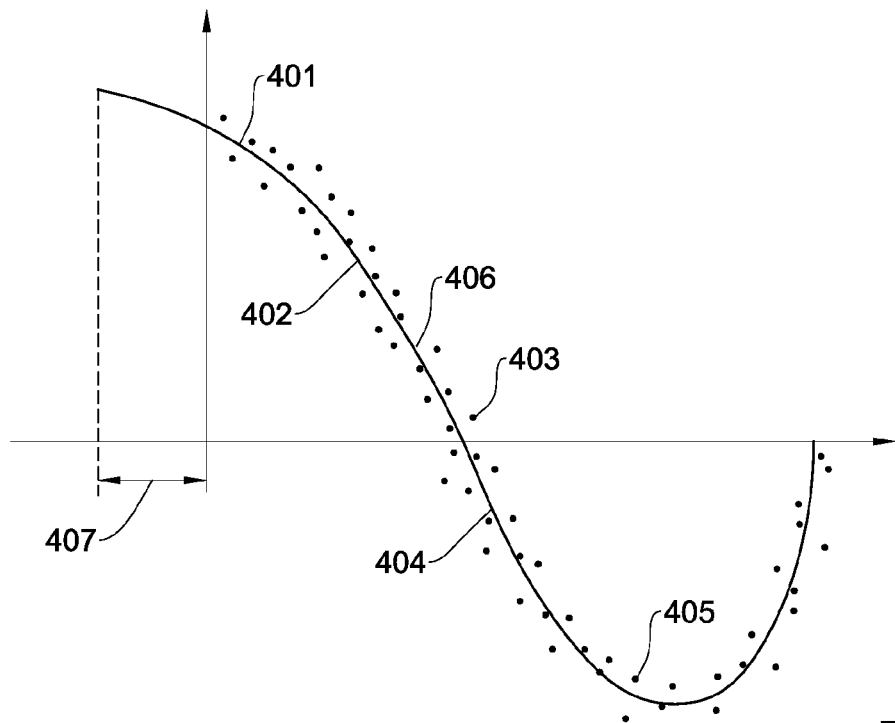
FIG. 4 illustrates a proximate sine value facilitating extraction of wander angle a, in accordance with certain embodiments of the invention.

For a better understanding of the foregoing, attention is drawn to FIG. 4, illustrating (schematically) a proximate sine value facilitating extraction of wander angle α, in accordance with certain embodiments of the presently disclosed subject matter. Thus, the various measurements obtained from the elevation rate gyro during the specified 360° rotation (of which only five are marked 401 to 405) are subjected to sine approximation 406 utilizing known per se approximation techniques, which allow to determine a phase shift 407 that corresponds to the sought wander angle α.

Note that in accordance with certain embodiments the longer the duration t of rotating in the azimuth plane (i.e. the specified at least 360° rotation), the higher the accuracy of the measurements, and accordingly the better is the fitted sine wave, and consequently the deviation angle α from the north is more accurate.

Figure 5:
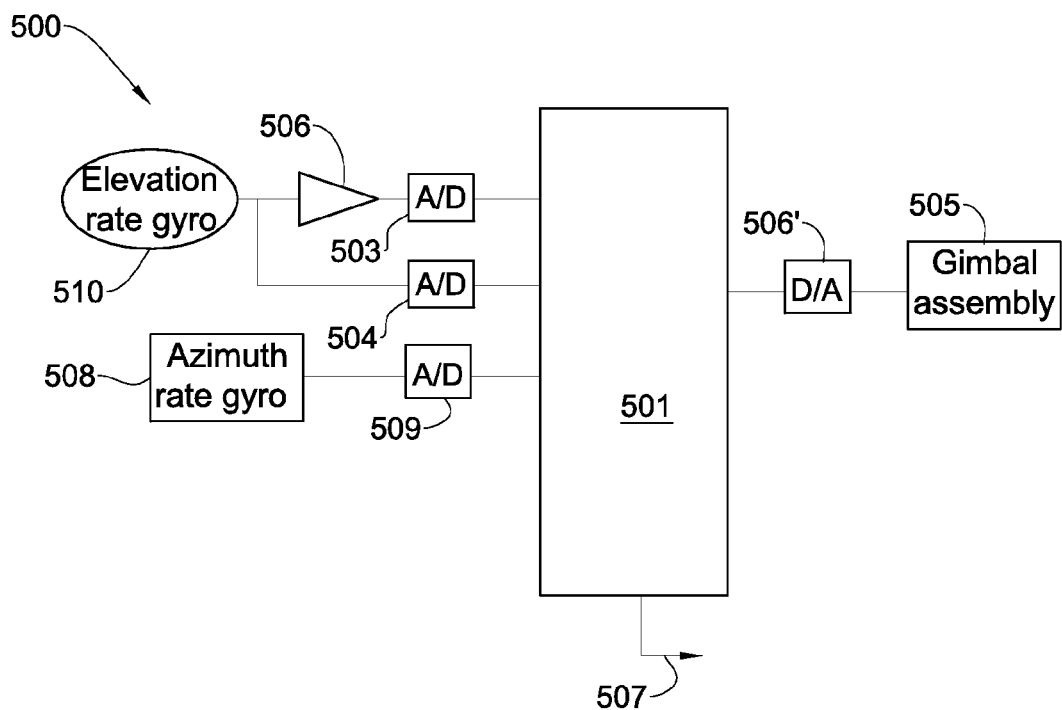
FIG. 5 illustrates a block diagram of a control system according to certain embodiments of the invention.

Turning now to FIG. 5, it illustrates a block diagram of a gyro assembly control module 500 according to certain embodiments of the invention. The assembly includes a processor 501 coupled to an elevation rate gyro 510 (forming part of the gyro assembly described with reference to FIG. 1) and azimuth rate gyro 508 (forming part of the gyro assembly described with reference to FIG. 1). The communication between the rate gyros and the processor and is through a known per se interface (including e.g. A/D converters 509 and 504) and the communication between the processor and the gimbal assembly 505 (for transmitting the compensation commands) is through a known per se interface, including e.g. D/A converter 506'.

As has been described, the payload is operable in at least two distinct modes: stabilization and North finding. In the stabilization mode, measurements are taken from the elevation rate gyro 510 (indicative of deviations in the elevation plane), which rotates at the order of say 100°/sec and after having converted to digital form (A/D 504) are fed to the processor 501 that is associated with a buffer (not shown in FIG. 5) for storing the measurements. As specified above, the dynamic range that corresponds to the obtained measurements may be for instance modulo 16 bits with the MSB designating the sign and the other 15 bits the content, all for representing measurements of the order of 100°/sec. Note that the rate of 100°/sec is provided by way of example only and is by no means binding.

The specified measurements are processed in a known per se manner by processor 501 and issue commands for transmitting to the gimbal assembly 505 (through D/A 506') for stabilization of closed loop control (not shown) which neutralizes the deviations effect and maintains stability of the platform in the elevation plane (e.g. maintaining LOS towards a given target).

Azimuth rate gyro (508) measurements are processed in the same manner for neutralizing the deviations effect and maintaining stability of the platform in the azimuth plane (e.g. maintaining LOS towards a given target), all as known per se.

In order to operate in the "deviation from the North" finding mode (North Finding mode) there is a need to measure considerably slower motion of the elevation rate gyro at the order of 15°/hour. This requires operating in a different dynamic range and to this end the measurements obtained at the output of elevation rate gyro 510 (the specified (Ω cos(φ) cos(α))) are amplified at amplifier 506 and are subjected to A/D converter 503 for processing by processor 501. The amplified measurements value at the output of amplifier 503 fall in a different dynamic range. Processor 501 yields data indicative of deviation from the north 507.

As further shown in FIG. 5, a tilt sensor (e.g. the specified Azimuth rate gyro 508) is configured to cause reduction or elimination in a known per se manner for undesired tilt measurements as fed to processor 501 by means of A/D 509.

Note that the invention is not bound by the specified structure of gyro assembly control that includes the processor and the specified interfaces. Accordingly, either or both of the processor and the interfaces may have different structure and possibly other elements may be added, all as required and appropriate.

For a better understanding of the amplifier gain, note the following. For normal stabilization control purposes, dynamic range of the elevation gyro is in the order of magnitude of say 100[°/s]. However, for north finding purposes, dynamic range of the elevation gyro should be modified to a more sensitive dynamic range (of the order of 15[°/h].

Tradeoffs for suitable dynamic range for sensing an earth rate order of magnitude—up to 15[°/hr], should include enough resolution to avoid known per se quantization noise on one hand and avoiding exciting the linear operating range on the other hand, as affected by bias stability and measurement noise over the required environmental conditions (hereinafter designated tradeoff parameter).

There follows a non limiting example of mode switching, amplification factor calculation:

Assuming:

Gyro full scale (normal control purpose) 100[°/s]

The desired range for north finding purpose using, say 5% of the full range (according to tradeoffs above):

Gyro, (north finding purpose) 15[°/hr]/(5/100)=0.083 [°/s]

This will yield the following amplification factor:

Amplification=100/0.083=~1000

Note that the latter example illustrated a dynamic range that is 1000 times more sensitive than that applicable for the stabilization mode. This, however, it is by no means binding. There may be various parameters that affect the difference of sensitivity, for instance the rotation rate of the gyros in the stabilization mode of operation. Thus, the specified 100[°/s] rotation rate is only an example and the rotation rate can be selected to be a value in the range of (50[°/s]-1000[°/s]), depending upon the particular application. Another parameter that may affect the sensitivity can be for example the tradeoff parameter (5% by way of non limiting example). Thus, the specified 5% is only an example tradeoff parameter.

Insofar as the dynamic range is concerned, if a 16 bits range is used for stabilization purposes, and assuming the MSB represents a sign and 15 bits represent content (±32768), then considering the specified rotation rate of 100[°/s], the LSB would represent ~3.05×10$^{-3}$[°/s] (100/32768=3.05 10$^{-3}$). Moving now to the more sensitive second dynamic range then the amplification factor of 1000 would result in ~2.6×10$^{-6}$[°/s] (15[°/h]/(0.05×3600×32768)).

Processor 501 is adapted based on the recorded measurements to construct a sine wave that fits the measurements, e.g. using a least square approximation, all as was explained with reference to FIG. 4 above.

Figure 6:
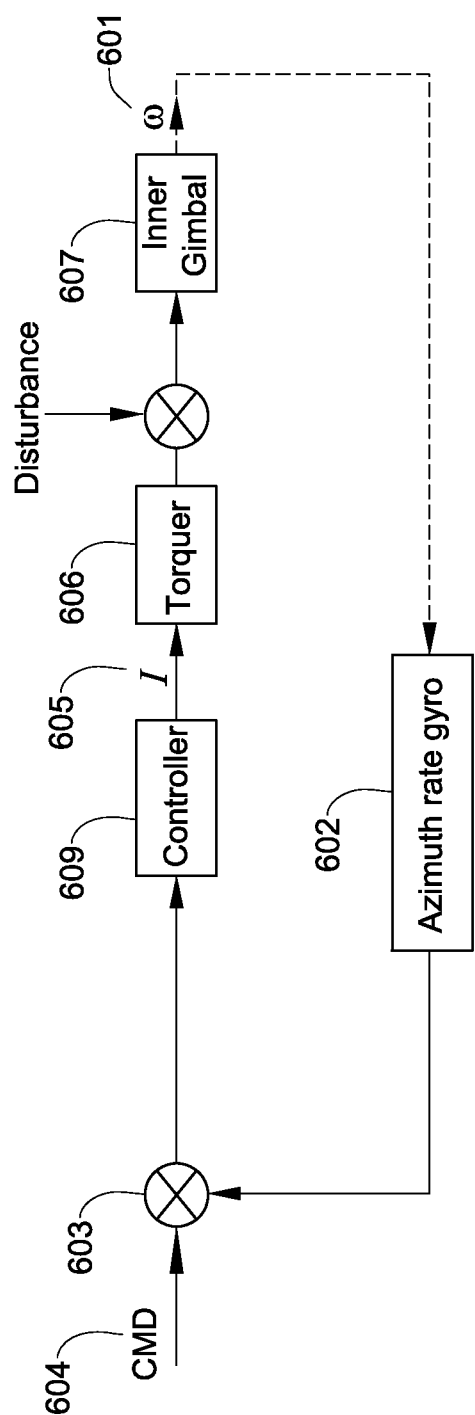
FIG. 6 illustrates a generalized stabilization sequence of operations used in a system according to certain embodiments of the invention.

Attention is now drawn to FIG. 6 illustrating a generalized stabilization sequence of operations used in a system according to certain embodiments of the invention. The stabilization sequence is generally known per se and therefore will be described briefly with respect to a given channel, say the azimuth. A similar stabilization procedure may be applied to the elevation channel. Thus, angular rate ω 601 is sensed by azimuth rate gyro 602 (508 of FIG. 5). The latter feeds the so measured angular rate to a comparator 603 (capable of receiving command 604 serving for excitation of the controller 609). The angular rate after being subjected to known per se control and PA (Power Amplifier) modules is subjected to integration 605 giving rise to angle data that is fed to the Torquer 606 (forming part of the gimbal assembly) that provided a correction command to inner gimbal 607 (forming part of gimbal assembly) for neutralizing the so measured angular rate ω. This closed loop operation continues until the measured deviation ω is substantially eliminated. Note that the comparison, controlling and the integration procedures (performed in 603 609 and 605 modules) may form part of the processor 501 of FIG. 5.

Unless specifically stated otherwise, as apparent from the following discussions, it is appreciated that throughout the specification discussions utilizing terms such as "processing", "triggering", "calculating" or the like, refer to the actions and/or processes of a processor that manipulate and/or transform data into other data, said data represented as physical quantities, e.g. such as electronic quantities, and/or said data representing the physical objects. The term "processor" should be expansively construed to cover any kind of electronic device with data processing capabilities, for example, as described in the subject matter of the present application. The processor may enable the teachings of the subject matter of the present invention either by being specially constructed for the desired purposes or by being a general purpose processor configured for the desired purpose by a computer program stored in a computer readable storage medium.

FIGS. 1A, 1B, 2, 5 and 6 illustrate a general schematic of a payload system architecture in accordance with an embodiment of the invention. The system may comprise fewer, more, and/or different modules than those shown in the Figs. In some embodiments, the functionality of system/element described herein may be divided differently among the modules. In some embodiments, the functionality of a system/element described herein may be divided into fewer, more and/or different modules than shown the Figs. In some embodiments, system/element may include additional or less functionality than described herein.

Unless stated otherwise, in addition to or instead of what may be construed from the description herein, all technical and scientific terms used herein may have the same meaning as understood by one of ordinary skill in the art.

The invention claimed is:

1. A payload including a gimbal assembly and associated gyro assembly, comprising
 a gyro assembly control associated with said gyro assembly and operable to trigger the gyro assembly to obtain deviation measurements in the azimuth plane and elevation plane and process the measurements in a first dynamic range corresponding to a first rotation rate range, for stabilizing the payload utilizing said gimbal assembly;
 the gyro assembly control being operable to trigger the gyro assembly to obtain instantaneous measurements from an elevation rate gyro and process the measurements in a second dynamic range corresponding to a second rotation rate range having more sensitivity than said first dynamic range, for finding deviation of the payload from the north of the earth.

2. The payload according to claim 1, wherein said gyro assembly includes an azimuth rate gyro and an elevation rate gyro disposed perpendicularly thereto;
 said gyro assembly control being operable to drive said elevation rate gyro to rotate about azimuth axis for obtaining and recording instantaneous measurements during at least 360° rotation;
 said gyro assembly control being further operable to derive a wander angle representative of said deviation from the north based on said recorded measurements.

3. The payload according to claim 2, wherein said gyro assembly control module is configured to calculate a sine wave that fits said measurements and derives said wander angle from said sine wave.

4. The payload according to claim 2 wherein the longer the duration t of said rotation about said azimuth axis, the lower the error of said measurements.

5. The payload according to claim 2, wherein said measurements yield:

$$\text{Measurements} = \Omega * \cos(\phi) * \cos(\alpha)$$

where Ω stands for the earth rotation rate
 φ stands for the latitude
 α stands for the wander angle that changes according to instantaneous measurements of the elevation rate gyro during the at least 360° rotation,
 and wherein said deviation being a phase shift α of the sine wave that fits said measurements.

6. The payload according to claim 1, further comprising a tilt sensor for sensing tilt measurements of the payload in either or both of roll and pitch axes, and wherein said gyro assembly control is configured to calculate compensation commands for transmission to said gimbal assembly for reducing or elimination said tilt measurements, whereby said payload is rendered leveled.

7. The payload according to claim 1, wherein said payload is fitted on a mobile platform that is subjected to spatial orientation deviations in either or both of azimuth plane or elevation plane, and wherein said spatial deviations are measured by said gyro assembly and wherein said measurements are processed by said gyro assembly control to obtain compensation commands for triggering the gimbal assembly to compensate for said spatial deviations and stabilize the payload.

8. The payload according to claim 2, wherein said payload is fitted on a mobile platform that is subjected to spatial orientation deviations in either or both of azimuth plane or elevation plane, and wherein said spatial deviations in the azimuth plane are measured by said azimuth rate gyro irrespective of said 360° rotation and wherein said spatial deviations in said elevation plane are measured by said elevation rate gyro irrespective of said 360° rotation and wherein said measurements are processed by said gyro assembly control to obtain data for triggering the gimbal assembly to compensate for said deviations and stabilize the payload.

9. The payload according to claim 1, wherein said sensitivity is dependent upon the rotation rate of the gyros in the stabilization mode of operation.

10. The payload according to claim 9, wherein the rotation rate is 100[°/s].

11. The payload according to claim 1, wherein said sensitivity is dependent upon a tradeoff parameter.

12. The payload according to claim 11, wherein said tradeoff parameter is 5%.

13. A payload according to claim 1, wherein said sensitivity is dependent upon the rotation rate of the gyros in the stabilization mode of operation.

14. A method for dual mode utilization of a payload that includes a gimbal assembly and associated a gyro assembly, comprising:
 (i) triggering the gyro assembly to obtain deviation measurements in the azimuth plane and elevation plane and process the measurements in a first dynamic range corresponding to a first rotation rate range, for stabilizing the payload utilizing said gimbal assembly;

(ii) triggering the gyro assembly to obtain instantaneous measurements from an elevation rate gyro and process the measurements in a second dynamic range corresponding to a second rotation rate range having more sensitivity than said first dynamic range, for finding deviation of the payload from the north of the earth.

15. The method according to claim 14 wherein said gyro assembly includes an azimuth rate gyro and an elevation rate gyro disposed perpendicularly thereto, further comprising driving said elevation rate gyro to rotate about azimuth axis for obtaining and recording instantaneous measurements during at least 360° rotation; and deriving a wander angle representative of said deviation from the north based on said recorded measurements.

16. The method according to claim 15, further comprising calculating a sine wave that fits said measurements and derives said wander angle from said sine wave.

17. The method according to claim 15, wherein the longer the duration t of said rotation about said azimuth axis, the lower the error of said measurements.

18. The method according to claim 15, wherein said measurements yield:

$$\text{Measurements} = \Omega * \cos(\phi) * \cos(\alpha),$$

where $\Omega$ stands for the earth rotation rate $\phi$ stands for the latitude $\alpha$ stands for the wander angle that changes according to instantaneous measurements of the elevation rate gyro during the at least 360° rotation, and wherein said deviation being a phase shift $\alpha$ of the sine wave that fits said measurements.

19. The method according to claim 14, further comprising sensing tilt measurements of the payload in either or both of roll and pitch axes; and calculating compensation commands for transmission to said gimbal assembly for reducing or elimination said tilt measurements, whereby said payload is rendered leveled.

20. The method according to claim 16, and further comprising measuring said spatial deviations and processing said measured deviations to obtain compensation commands for triggering the gimbal assembly to compensate for said spatial deviations and stabilize the payload.

* * * * *